(12) United States Patent
Kanada et al.

(10) Patent No.: US 7,289,296 B2
(45) Date of Patent: Oct. 30, 2007

(54) THIN-FILM MAGNETIC HEAD HAVING MAGNETIC GAP FORMED OF NIP

(75) Inventors: Yoshihiro Kanada, Niigata-ken (JP); Hisayuki Yazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 323 days.

(21) Appl. No.: 10/631,580

(22) Filed: Jul. 31, 2003

(65) Prior Publication Data
US 2004/0023068 A1 Feb. 5, 2004

Related U.S. Application Data

(62) Division of application No. 09/851,776, filed on May 9, 2001, now Pat. No. 7,037,421.

(30) Foreign Application Priority Data
May 19, 2000 (JP) .............................. 2000-147421

(51) Int. Cl.
*G11B 5/31* (2006.01)
(52) U.S. Cl. ...................................... 360/126; 205/258
(58) Field of Classification Search ................. 205/258
See application file for complete search history.

(56) References Cited

U.S. PATENT DOCUMENTS

| 4,042,382 A | * | 8/1977 | Feldstein ..................... 420/441 |
| 4,345,007 A |   | 8/1982 | Fahy et al. |
| 4,735,853 A | * | 4/1988 | Okudaira et al. ........... 428/336 |
| 4,855,020 A | * | 8/1989 | Sirbola ........................ 205/137 |
| 5,285,340 A |   | 2/1994 | Ju et al. |
| 5,331,497 A | * | 7/1994 | Fuchigami ................... 360/126 |
| 5,452,164 A |   | 9/1995 | Cole et al. |
| 5,649,351 A |   | 7/1997 | Cole et al. |
| 5,652,687 A |   | 7/1997 | Chen et al. |
| 5,802,700 A |   | 9/1998 | Chen et al. |
| 5,872,693 A | * | 2/1999 | Yoda et al. .................. 360/126 |
| 6,103,367 A | * | 8/2000 | Weir et al. ................... 428/336 |
| 6,163,436 A | * | 12/2000 | Sasaki et al. ................ 360/126 |
| 6,381,093 B2 | * | 4/2002 | Yoshida et al. ............. 360/126 |
| 7,167,340 B2 | * | 1/2007 | Sato et al. ................... 360/126 |

FOREIGN PATENT DOCUMENTS

| JP | 63-188829 | 8/1988 |
| JP | 6-28626 | 2/1994 |
| JP | 6-301919 | 10/1994 |
| JP | 10-34410 | 12/1998 |

* cited by examiner

*Primary Examiner*—Roy King
*Assistant Examiner*—William T. Leader
(74) *Attorney, Agent, or Firm*—Brinks Hofer Gilson & Lione

(57) ABSTRACT

A gap of a thin-film magnetic head is formed of NiP. The P content of the NiP gap layer is controlled to be within the range of 11 mass percent to 14 mass percent so that the gap layer is nonmagnetic.

2 Claims, 12 Drawing Sheets

P CONTENT (MASS PERCENT)

THIN-FILM MAGNETIC HEAD HAVING MAGNETIC GAP FORMED OF NIP

This application is a divisional application of U.S. application Ser. No. 09/851,776 filed on May 9, 2001, now U.S. Pat. No. 7,037,421 entitled "Thin-Film Magnetic Head Having Magnetic Gap Formed of NiP."

BACKGROUND OF THE INVENTION

1. Field of the Invention

The present invention relates to thin-film magnetic recording heads used as floating magnetic heads and the like. In particular, the present invention relates to a thin-film magnetic head which generates a leakage magnetic flux at a proper position and meets trends toward higher density and higher recording frequencies and to a method for making the same.

2. Description of the Related Art

FIG. 17 is a partial front view of a structure of a conventional thin-film magnetic head (an inductive head). The thin-film magnetic head has a lower core layer 1 formed of a magnetic material, such as permalloy, and an insulating layer 9 formed on the lower core layer 1.

The insulating layer 9 has a groove 9a which extends from a face opposing a recording medium (hereinafter, referred to as an air bearing surface or ABS) in the height direction (the Y direction in the drawing) and has an inner width equal to the track width Tw.

A lower magnetic pole layer 3 which is magnetically coupled with the lower core layer 1, a gap layer 4, and an upper magnetic pole layer 5 which is magnetically coupled with the substrate holder 6 are formed by plating from the bottom of the groove 9a.

A coil layer having a spiral pattern (not shown in the drawing) is provided on the insulating layer 9 in the height direction (the Y direction in the drawing).

The coil layer is covered by a coil insulating layer (not shown in the drawing) such as a resist layer, and the coil insulating layer is covered by an upper core layer 6. The edge of the upper core layer 6 is magnetically coupled with the upper magnetic pole layer 5.

In the production of the inductive head shown in FIG. 17, the insulating layer 9 is formed on the lower core layer 1, and then the groove 9a extending from the ABS and having the track width Tw and a predetermined length in the height direction is formed in the insulating layer 9.

Next, the lower magnetic pole layer 3, the gap layer 4, and the upper magnetic pole layer 5 are formed in the groove 9a by plating. The coil layer is formed on the insulating layer 9 behind the groove 9a in the Y direction by patterning. The coil layer is covered with the coil insulating layer, and then the upper core layer 6 is formed over the upper magnetic pole layer 5 and the coil insulating layer by a frame plating process to complete the inductive head shown in FIG. 17.

In this inductive head, a recording current flowing in the coil layer induces a recording magnetic field in the lower core layer 1 and the upper core layer 6. A leakage magnetic field generated between the lower magnetic pole layer 3 magnetically coupled with the lower core layer 1 and the upper magnetic pole layer 5 magnetically coupled with the upper core layer 6 is recorded as magnetic signals on a recording medium such as a hard disk.

In this inductive head, the lower magnetic pole layer 3, the gap layer 4, and the upper magnetic pole layer 5 having the track width Tw are locally formed in the vicinity of the ABS (the face opposing the recording medium). Such an inductive head is suitable for narrower track widths.

However, almost no studies on forming a gap layer not having magnetism of a thin-film magnetic head by plating have been performed in consideration of various conditions including the composition of a metallic material to be used.

SUMMARY OF THE INVENTION

It is an object of the present invention to provide a thin-film magnetic head which has a nonmagnetic gap layer of a specified metallic material composition and which effectively generates a leakage magnetic field and to provide a method for making the thin-film magnetic head.

A thin-film magnetic head in accordance with the present invention comprises a lower core layer, a gap layer formed directly on the lower core layer or on a lower magnetic pole layer provided on the lower core layer, and an upper core layer formed directly on the gap layer or on an upper magnetic pole layer defining a track width provided on the gap layer, wherein the gap layer comprises NiP, the P content of the NiP being in the range of 11 mass percent to 14 mass percent.

If the P content of the NiP of the gap layer is in the range of 11 mass percent to 14 mass percent, the gap layer is nonmagnetic in an unheated state.

Preferably, the P content of the NiP is in the range of 12.5 mass percent to 14 mass percent. In such a case, the gap layer is nonmagnetic even when the gap layer is heated to 200° C. or more.

When the metallic NiP is used in the gap layer, the lower magnetic pole layer, the gap layer, and the upper magnetic pole layer can be continuously formed by plating, significantly simplifying the production process of the thin-film magnetic head.

The gap layer must be nonmagnetic. If the gap layer has magnetism, a magnetic flux flowing in the lower magnetic pole layer and the upper magnetic pole layer permeates the gap layer, so that no leakage magnetic field is generated between the lower magnetic pole layer and the upper magnetic pole layer.

Accordingly, a leakage magnetic field is effectively generated in the vicinity of the gap layer in the present invention.

The present invention also relates to a method for making a thin-film magnetic head comprising a lower core layer comprising a magnetic material and an upper core layer comprising a magnetic material opposing the lower core layer provided with a gap layer therebetween. The method comprises the steps of:

(a) forming the lower core layer by plating;

(b) forming the gap layer directly on the lower core layer, or forming a lower magnetic pole layer on the lower core layer and then the gap layer on the lower magnetic pole layer by plating; and (c) forming the upper core layer directly on the gap layer or forming an upper magnetic pole layer on the gap layer and then the upper core layer on the upper magnetic pole layer by plating;

wherein the gap layer is formed using NiP having a P content in the range of 11 mass percent to 14 mass percent.

Preferably, the P content of the NiP is in the range of 12.5 mass percent to 14 mass percent.

Preferably, at least the lower magnetic pole layer is formed by an electrolytic plating process using a pulsed current.

When a DC current is used for the formation of the lower magnetic pole layer by plating, the surface of the lower magnetic pole layer formed may be curved or scorched. Also the gap layer formed thereon may be curved.

When the lower magnetic pole layer is formed by an electrolytic plating process using a pulsed currents the total charge supply (current) can be reduced while the charge supply per second is maximized during the formation of the lower magnetic pole layer. Thus, the supplied pulsed current is large enough that the current density in the groove is uniform, but does not scorch the lower magnetic pole layer during the plating.

Accordingly, the resulting lower magnetic pole layer and the gap layer do not have curved surfaces and thus exhibit high quality.

DESCRIPTION OF THE PREFERRED EMBODIMENTS

Figure 1:
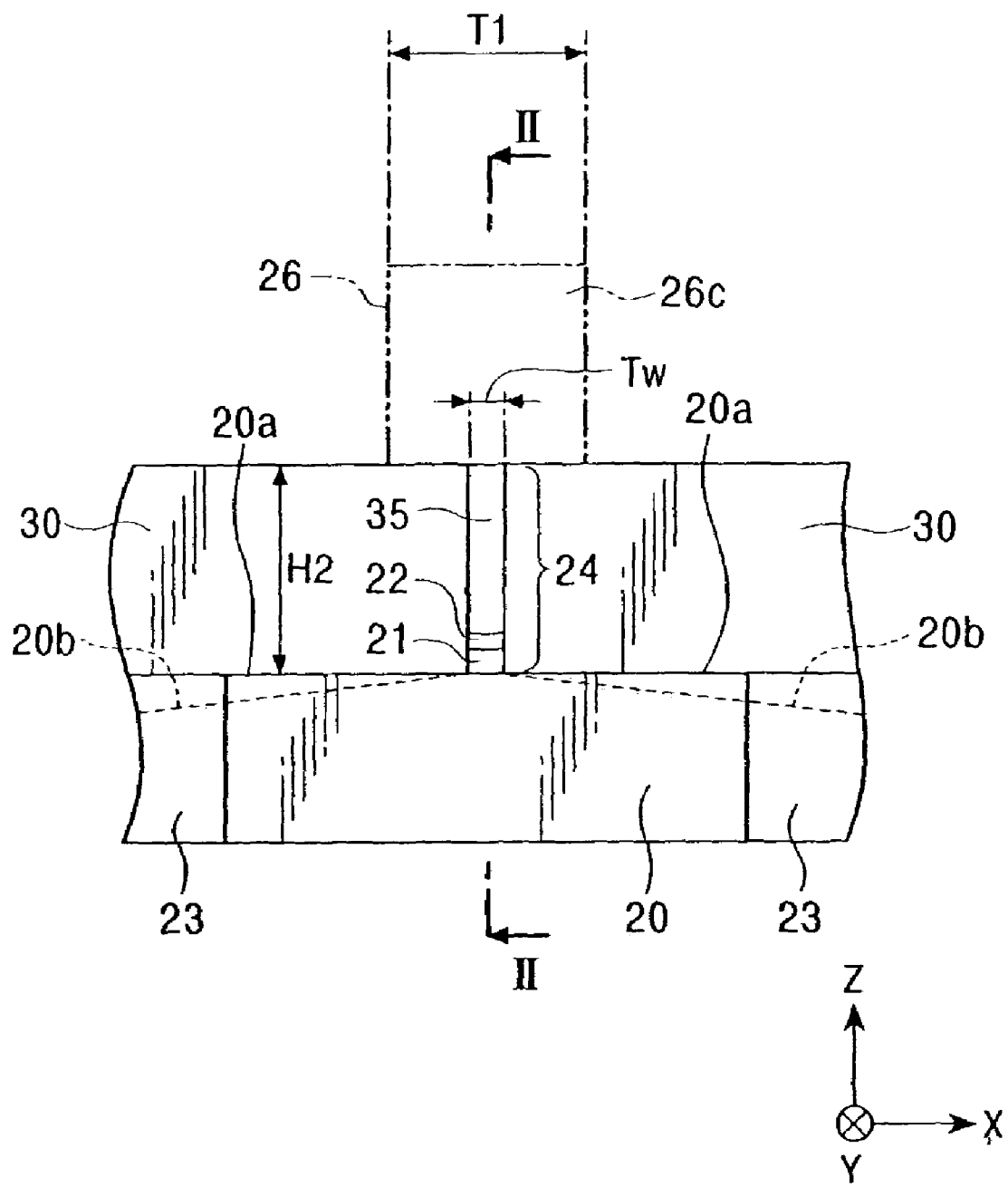
FIG. 1 is a front view of a thin-film magnetic head in accordance with a first embodiment of the present invention.

FIG. 1 shows a thin-film magnetic head in accordance with the present invention. This thin-film magnetic head is an inductive recording head. A read head (magnetoresistive head=MR head) having a magnetoresistive effect may be provided below the inductive head in the present invention. The inductive head has a lower core layer 20 formed of a magnetic material such as permalloy. When the read head is formed below the lower core layer 20, a shielding layer may be provided in addition to the lower core layer 20 to protect the magnetoresistive element from noise, or the lower core layer 20 may be used as an upper shielding layer of the read head without providing a separate shielding layer.

As shown in FIG. 1, insulating layers 23 are formed on both sides of the lower core layer 20. Upper faces 20a of the lower core layer 20 extend from both base ends of a lower magnetic pole layer 21 in the X direction. The upper faces 20a may be horizontal (parallel to the track width direction). Alternatively, the lower core layer 20 may have upper faces 20b which slant downward instead of the upper faces 20a which extend horizontally. The slanting upper faces 20b reduce the generation of side fringing.

Figure 2:
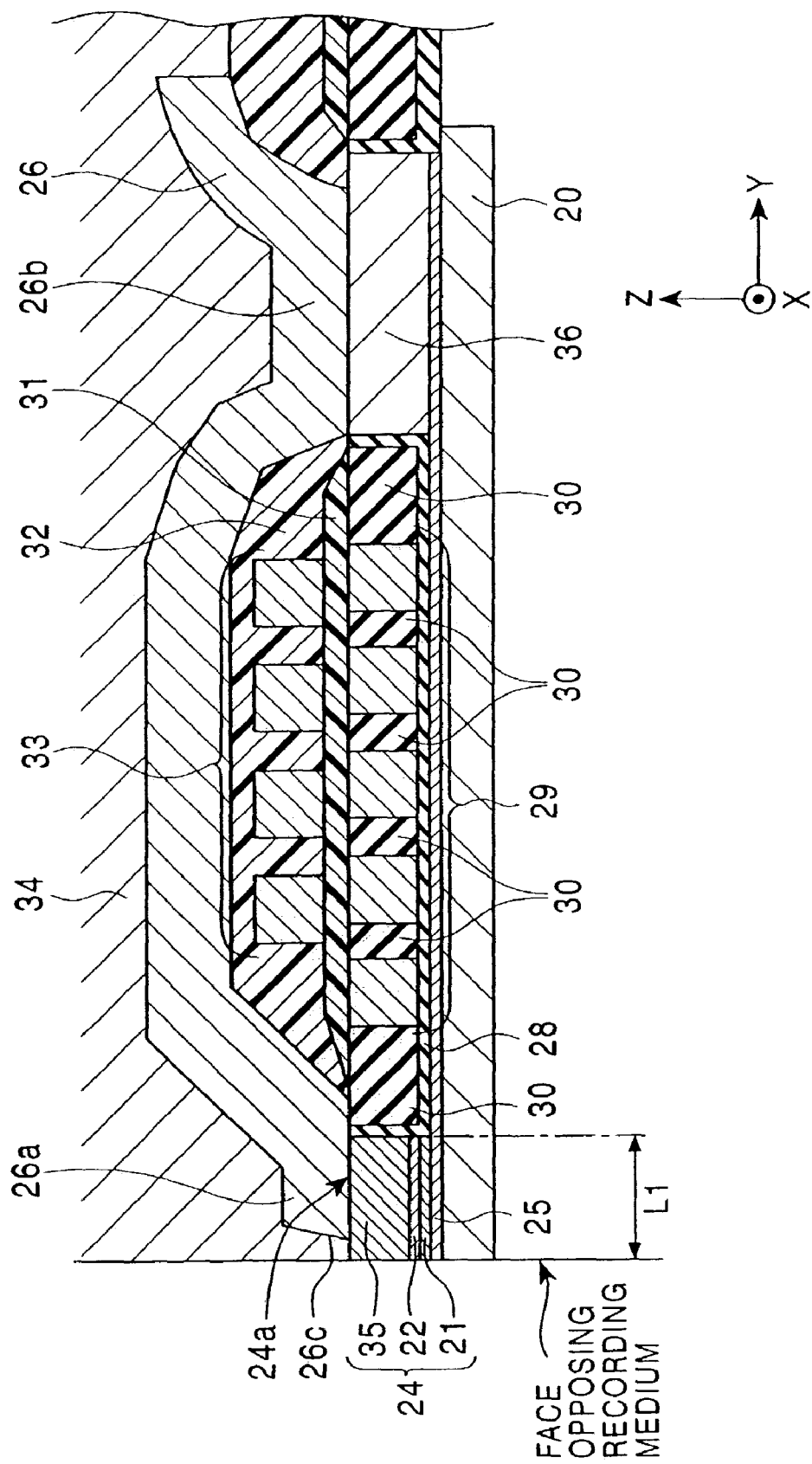
FIG. 2 is a partial cross-sectional view taken from line II-II in FIG. 1.

With reference to FIGS. 1 and 2, a recording core 24 is formed on the lower core layer 20 so as to be exposed at a face opposing a recording medium. In this embodiment, the recording core 24 defines the track width Tw. The track width Tw is preferably 0.7 μm or less and more preferably 0.5 μm or less.

In this embodiment, the recording core 24 is a triple-layer laminate of the lower magnetic pole layer 21, a gap layer 22, and an upper magnetic pole layer 35. The lower magnetic pole layer 21, the bottom most layer of the recording core 24, is formed on a plating underlayer 25 provided on the lower core layer 20. The lower magnetic pole layer 21 is magnetically coupled with the lower core layer 20. The lower magnetic pole layer 21 and the lower core layer 20 may be composed of the same material or different materials. The lower magnetic pole layer 21 may have a single-layer or multiple-layer configuration. The height of the lower magnetic pole layer 21 is, for example, approximately 0.3 μm.

The nonmagnetic gap layer 22 is formed on the lower magnetic pole layer 21. The gap layer 22 is formed on the lower magnetic pole layer 21 by plating using a nonmagnetic metallic material. In the present invention, the nonmagnetic metallic material is NiP and the P content of the NiP is in the range of 11 mass percent to 14 mass percent. This gap layer 22 is nonmagnetic when the gap layer is not heated. Preferably, the P content of the NiP is in the range of 12.5 mass percent to 14 mass percent in order to maintain a nonmagnetic state in the gap layer 22 at temperatures of 200° C. or more. The gap layer may be composed of a single NiP layer or a laminate of a NiP sublayer and a nonmagnetic metal sublayer. The gap layer 22 has a height of, for example, approximately 0.2 μm.

The upper magnetic pole layer 35 which is magnetically coupled with an upper core layer 26 (described below) is formed on the gap layer 22 by plating. The upper magnetic pole layer 35 and the upper core layer 26 may be formed of the same material or different materials. The upper magnetic pole layer 35 may have a single-layer or multilayer configuration. The upper magnetic pole layer 35 has a height of, for example, 2.4 μm to 2.7 μm.

Since the gap layer 22 is formed of metallic NiP, the lower magnetic pole layer 21, the gap layer 22, and the upper magnetic pole layer 35 can be continuously formed by plating.

In the present invention, the configuration of recording core 24 is not limited to the above triple-layer configuration. For example, the recording core 24 may have a double-layer configuration including the gap layer 22 and the upper magnetic pole layer 35.

As described above, both the lower magnetic pole layer 21 and the upper magnetic pole layer 35 may be formed of the same material as or different materials from that of the corresponding core layer. However, it is preferable, in order to improve recording density, that the lower magnetic pole layer 21 and the upper magnetic pole layer 35 sandwiching the gap layer 22 have saturation magnetic flux densities which are higher than those of the corresponding core layers magnetically coupled therewith. In such a case, the recording magnetic field is concentrated in the vicinity of the gap, improving the recording density.

As shown in FIG. 2, the recording core 24 has a length L1 in the height direction (the Y direction in the drawing) from the face opposing the recording medium (ABS).

A coil layer 29 having a spiral pattern is formed behind the recording core 24 in the height direction (the Y direction in the drawing) on an insulating underlayer 28 which is provided on the lower core layer 20. Preferably, the insulating underlayer 28 is formed of at least one insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The gaps between conductive sections of the spiral coil layer 29 are filled with an insulating layer 30. Preferably, the insulating layers 30 is formed of at least one insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIGS. 1 and 2, the insulating layer 30 is formed so as to surround the recording core 24 and is exposed at the face opposing the recording medium at both sides of the recording core 24 in the track width direction (the X direction in the drawing).

[0045~46]

As shown in FIG. 2, an insulating layer 31 composed of an organic insulating material such as a resist or polyimide is formed on the insulating layers 30. Moreover, a spiral second coil layer 33 is formed on the insulating layer 31. The second coil layer 33 is covered by an insulating layer 32 formed of an organic material, such as a resist or polyimide. The upper core layer 26, composed of a NiFe alloy or the like, is patterned on the insulating layer 32 by a frame plating process or the like.

As shown in FIG. 2, the front end 26a of the upper core layer 26 is magnetically coupled with the upper magnetic pole layer 35, whereas the base 26b of the upper core layer 26 is magnetically coupled with a bank layer 36 which is formed on the lower core layer 20 and which is composed of a magnetic material such as a NiFe alloy. The base 26b of the upper core layer 26 may be directly coupled with the lower core layer 20. In such a case, the bank layer 36 is not necessary.

The thin-film magnetic head shown in FIG. 2 has two coil layers. The thin-film magnetic head in the present invention may have only one coil layer. In such a case, for example, the rear portion in the height direction of the recording core 24 on the lower core layer 20 is filled with the insulating layer 30, and the coil layer is formed on the insulating layer 30. Alternatively, the upper core layer 26 may be formed on the insulating layer 31 instead of the second coil layer 33.

The front face 26c of the upper core layer 26 is not exposed at the face opposing the recording medium and recedes from the face in the height direction (the Y direction in the drawing). This configuration adequately reduces the generation of side fringing, and the resulting thin-film magnetic head is suitable for the higher recording densities required in future. However, the front face 26c of the upper core layer 26 may be exposed at the face opposing the recording medium. Alternatively, as shown in FIG. 2, the front face 26c of the upper core layer 26 may be slanted or curved so that it gradually recedes in the height direction (the Y direction in the drawing) at the upper core layer side rather than the lower core layer side. If the front face 26c is curved, the curve may be convex or concave.

Moreover, the front face 26c of the upper core layer 26 may be curved so as to gradually recede in the height direction at both sides in the track width direction. Since the corners between the front face 26c and the side faces are rounded in this configuration, leakage of the magnetic flux between the upper core layer 26 and the upper magnetic pole layer 35 is further reduced, thereby further reducing side fringing. However, the front face 26c of the upper core layer 26 may be parallel to the face opposing the recording medium.

As shown in FIG. 1, the width of the upper core layer 26 in the track width direction is larger than the width of the upper magnetic pole layer 35 at the junction therebetween. Thus, the magnetic flux effectively flows from the upper core layer 26 towards the upper magnetic pole layer 35, thereby improving recording characteristics.

Preferably, the width of the upper core layer 26 in the track width direction at the junction between the upper core layer 26 and the recording core 24 is 2 to 2.5 times the width of the recording core 24 in the track width direction. With this configuration, the upper core layer 26 can be precisely deposited on the upper face of the recording core 24. Thus, the magnetic flux from the upper core layer 26 effectively flows to the upper magnetic pole layer 35.

Figure 3:
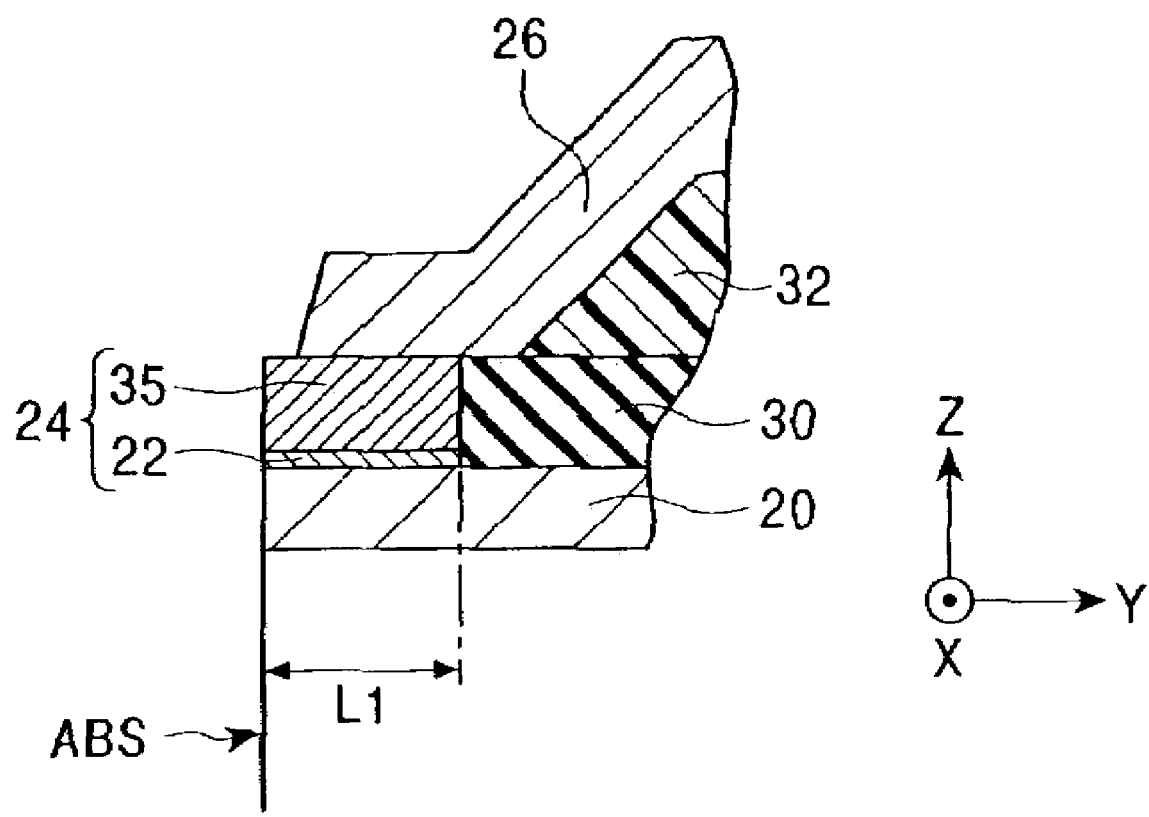
FIG. 3 is a partial cross-sectional view of a thin-film magnetic head in accordance with a second embodiment of the present invention.

With reference to FIG. 3 which shows a second embodiment of the thin-film magnetic head in accordance with the present invention, the recording core 24 may be composed of the gap layer 22, directly formed on the lower core layer 20 by plating, and the upper magnetic pole layer 35.

Figure 4:
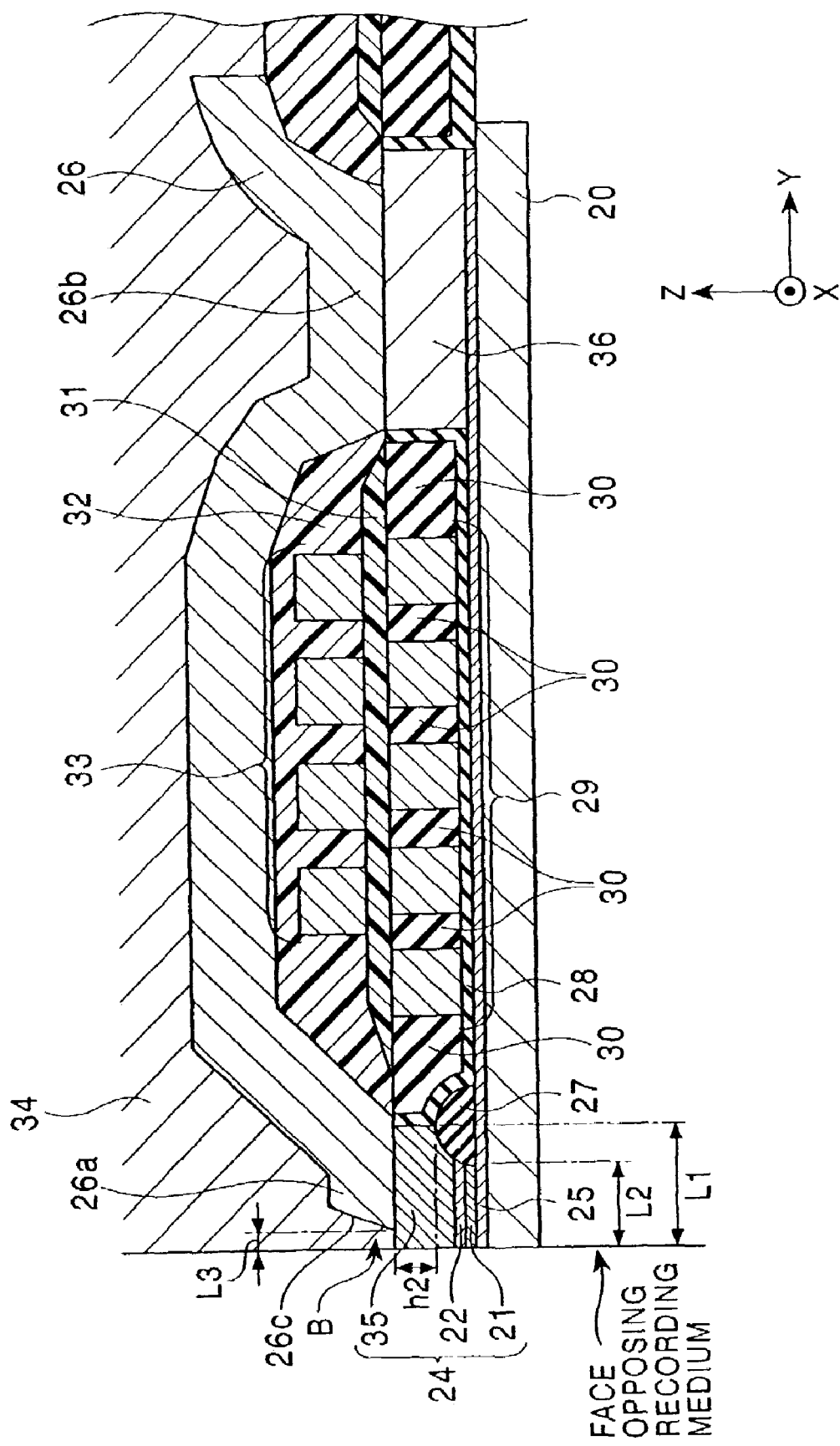
FIG. 4 is a partial cross-sectional view of a thin-film magnetic head in accordance with a third embodiment of the present invention.

FIG. 4 is a partial cross-sectional view of a thin-film magnetic head in accordance with a third embodiment of the present invention. A gap-depth-defining insulating layer 27 (hereinafter referred to as a Gd-defining insulating layer 27) composed of, for example, a resist is formed on the lower core layer 20. The Gd-defining insulating layer 27 has a curved surface. The rear ends of the lower magnetic pole layer 21 and the gap layer 22 in the height direction are in contact with the curved surface of the Gd-defining insulating layer 27. Furthermore, the upper magnetic pole layer 35 extends to the curved surface of the Gd-defining insulating layer 27.

Also, in this embodiment, the gap layer 22 is formed on the lower magnetic pole layer 21 by plating using a specific nonmagnetic metallic material, i.e., NiP having a specific P content in the range of 11 mass percent to 14 mass percent. Thus, the gap layer 22 is nonmagnetic when the gap layer 22 is not heated. In particular, at a P content in the range of 12.5 mass percent to 14 mass percent, the gap layer 22 is still nonmagnetic even when the gap layer 22 is heated to temperatures of 200° C. or more.

The height h2 of the upper magnetic pole layer 35 is in the range of 1.4 µm to 1.7 µm on the Gd-defining insulating layer 27.

The upper magnetic pole layer 35 formed on the Gd-defining insulating layer 27 has an increased length L1 and therefore has a large volume. Since the magnetic saturation of the upper magnetic pole layer 35 is reduced in higher density recording, recording characteristics are improved.

The length L2 from the front face of the Gd-defining insulating layer 27 to the face opposing to the recording medium defines the gap depth Gd. Since the gap depth Gd significantly affects the electrical characteristics of the thin-film magnetic head, the gap depth Gd is set to a predetermined length.

In the embodiment shown in FIG. 4, the gap depth Gd is determined by the position of the Gd-defining insulating layer 27 on the lower core layer 20.

Figure 5:
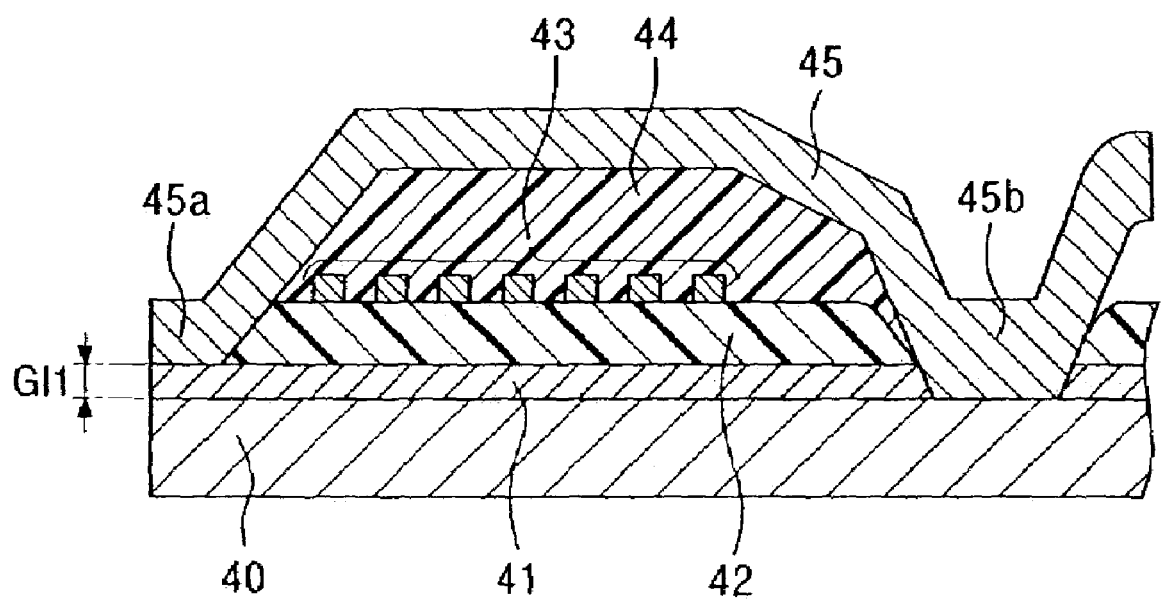
FIG. 5 is a partial cross-sectional view of a thin-film magnetic head in accordance with a fourth embodiment of the present invention.

FIG. 5 is a partial cross-sectional view of a thin-film magnetic head in accordance with a fourth embodiment of the present invention. The left face of this thin-film magnetic head is a face opposing a recording medium. In this embodiment, a gap layer 41 is formed on a lower core layer 40 by plating using a specific nonmagnetic metallic material, i.e., NiP having a specific P content in the range of 11 mass percent to 14 mass percent. Thus, the gap layer 22 is nonmagnetic when the gap layer 22 is not heated. In particular, at a P content in the range of 12.5 mass percent to 14 mass percent, the gap layer 22 is still nonmagnetic even when the gap layer 22 is heated to temperatures of 200° C. or more.

A spiral coil layer 43 is formed by patterning on an insulating layer 42 of polyimide or a resist material provided on the gap layer 41. The coil layer 43 is composed of a nonmagnetic conductive material having low resistance such as copper.

The coil layer 43 is surrounded by an insulating layer 44 formed of polyimide or a resist material. An upper core layer 45 composed of a soft magnetic material is formed on the insulating layer 44.

The front end 45a of the upper core layer 45 lies on the lower core layer 40 provided with the gap layer 41 therebetween at the face opposing the recording medium to define a magnetic gap having a gap length G11. The base 45b of the upper core layer 45 is magnetically coupled with the lower core layer 40.

When the saturation magnetic flux density Ms of the lower core layer 40 is lower than the saturation magnetic flux density Ms of the upper core layer 45, writing density of signals onto a recording medium is enhanced by magnetization reversion of the leakage magnetic field between the lower core layer 40 and the upper core layer 45, although it is preferable that the saturation magnetic flux density Ms of the lower core layer 40 be high.

FIGS. 6 to 11 show a series of steps illustrating a method for making the thin-film magnetic head shown in FIGS. 1 and 2.

Figure 6:
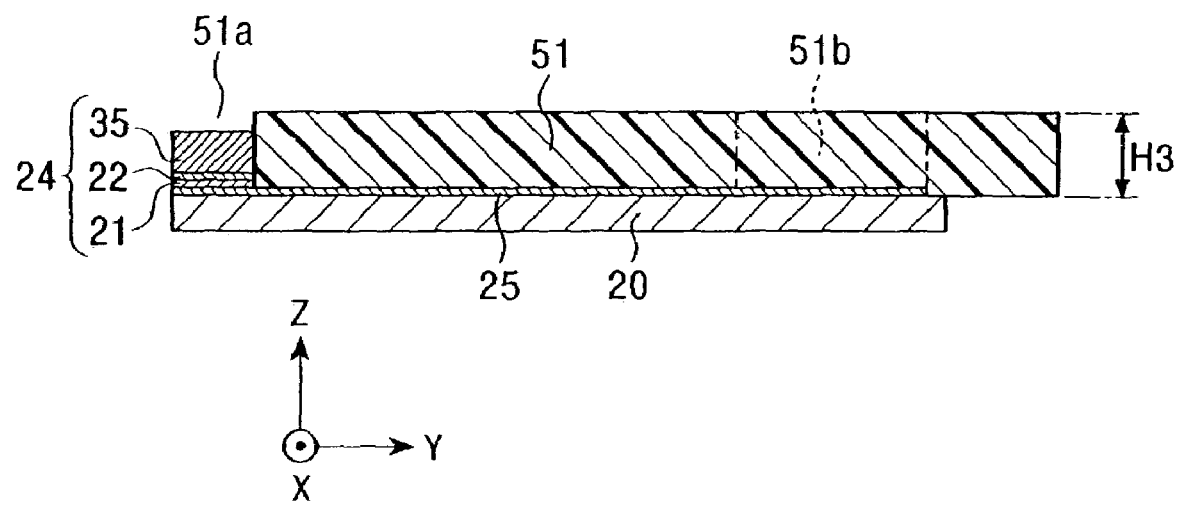
FIG. 6 shows a step of a method for making the thin-film magnetic head shown in FIGS. 1 and 2.

With reference to FIG. 6, a resist layer 51 is applied onto the lower core layer 20. The resist layer 51 has a thickness H3 which is larger than the thickness H1 of the recording core 24 in the thin-film magnetic head shown in FIG. 1.

A groove 51a is formed in the resist layer 51 by exposure and then development. The groove 51a has a predetermined length from the face opposing the recording medium in the height direction (the Y direction in the drawing) and a predetermined width in the track width direction (the X direction in the drawing). The recording core 24 is formed in the groove 51a.

As shown in FIG. 4, the recording core 24 consists of the lower magnetic pole layer 21, the gap layer 22, and the upper magnetic pole layer 35, which are continuously formed on the plating underlayer 25 by plating.

In the present invention, the gap layer 22 is formed of a specific nonmagnetic metallic material, that is, NiP in which the P content of the NiP is in the range of 11 mass percent to 14 mass percent. This gap layer 22 is nonmagnetic when the gap layer is not heated. Preferably, the P content of the NiP is in the range of 12.5 mass percent to 14 mass percent in order to maintain the nonmagnetic state of the gap layer 22 at temperatures of 200° C. or more.

In this embodiment, the lower magnetic pole layer 21 is formed by an electrolytic plating process using a pulsed current. In this case, the total charge supply (current) can be reduced while the charge supply per second is maximized during the formation of the lower magnetic pole layer 21. Thus, the supplied pulsed current is so large that the current density in the groove 51a is uniform, but does not scorch the plated layer. Accordingly, the resulting lower magnetic pole layer 21 has a substantially flat surface.

Also, the lower core layer 20, the gap layer 22, the upper magnetic pole layer 35, the coil layer 29, and the upper core layer 26 may be formed by an electrolytic plating process using a pulsed current.

The layer configuration of the recording core 24 formed in the groove 51a is not limited to the above triple-layer configuration, and may be any configuration as long as the following conditions are met. That is, the recording core 24 includes the lower magnetic pole layer 21 which connects to the lower core layer 20 and/or the upper magnetic pole layer 35 which connects to the upper core layer 26; and the gap layer 22 lies between either the upper core layer 26 or the lower core layer 20 and the corresponding magnetic pole layer, or between the lower magnetic pole layer 21 and the upper magnetic pole layer 35.

With reference to FIG. 6 again, a cavity 51b is formed at the rear end (in the height direction) of the resist layer 51 by exposure and development. The bank layer 36 is formed in the cavity 51b, which is formed of a magnetic material, as shown in FIG. 7.

Figure 7:
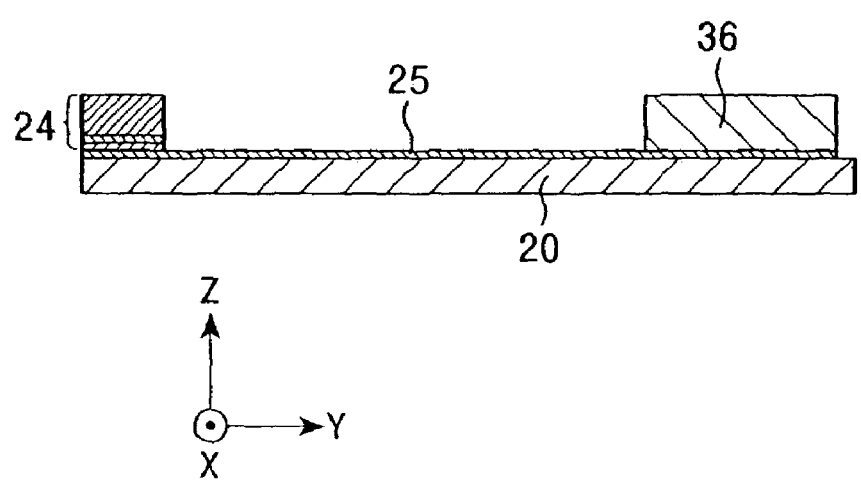
FIG. 7 shows a step subsequent to the step shown in FIG. 6.

In the step shown in FIG. 7, the resist layer 51 has been removed. The recording core 24 is on the lower core layer 20 in the vicinity of the ABS, while the bank layer 36 is formed on the lower core layer 20 at a position distant from the recording core 24 in the height direction.

Both sides (in the X direction in the drawing) of the recording core 24 shown in FIG. 7 may be etched by ion milling from the track width direction to reduce the width of the recording core 24. The width (in the X direction) of the recording core 24 after the ion milling defines the track width Tw. The ion milling also etches the upper faces of the lower core layer 20 extending in the track width direction (the X direction in the drawing) from the base ends to form the slanting upper faces on the lower core layer 20.

Figure 8:
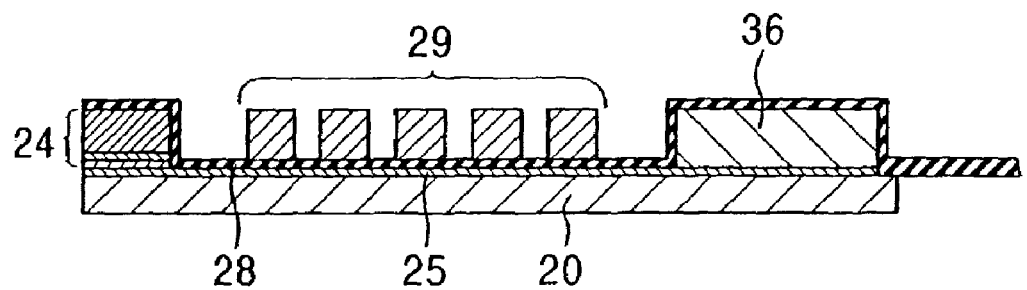
FIG. 8 shows a step subsequent to the step shown in FIG. 7.

In the step shown in FIG. 8, the insulating underlayer 28 composed of an insulating material is formed over the recording core 24, the lower core layer 20, and the bank layer 36 in the height direction by sputtering. Then, the coil layer 29 is formed on the insulating underlayer 28 by patterning. The upper face of the coil layer 29 may be lower than a junction face 24a of the recording core 24 shown in FIG. 10.

Figure 9:
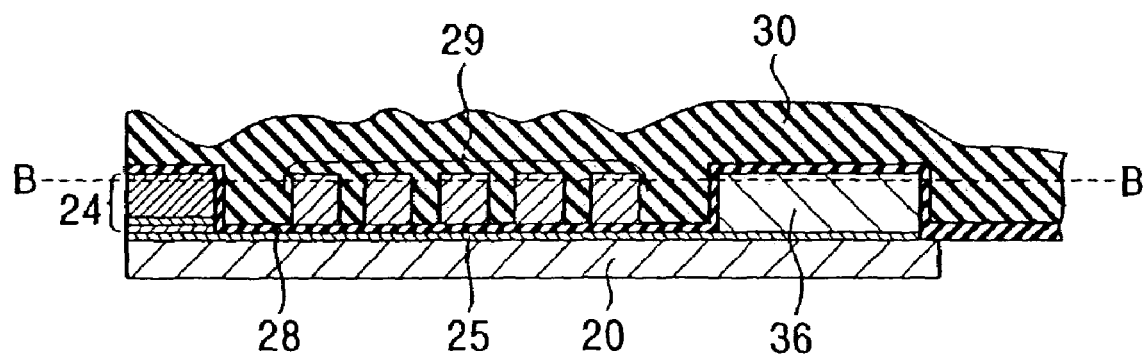
FIG. 9 shows a step subsequent to the step shown in FIG. 8.

In the step shown in FIG. 9, the coil layer 29 is covered with the insulating layer 30. The recording core 24 and the bank layer 36 are also covered by the insulating layer 30. In this embodiment, the insulating layer 30 is formed by sputtering using an inorganic material. Preferably, the inorganic material comprises at least one selected from $Al_2O_3$, SiN, and $SiO_2$.

Figure 10:
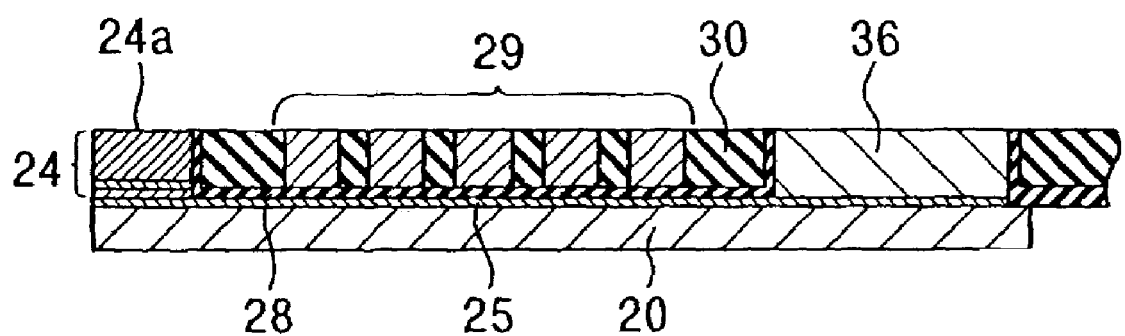
FIG. 10 shows a step subsequent to the step shown in FIG. 9.

With reference to FIG. 10, the surface of the insulating layer 30 is polished by a chemical-mechanical polishing (CMP) technology or the like to line B-B in order to expose the surface of the recording core 24 and the surface of the coil layer 29. The surface of the coil layer 29 might not be exposed at the face which is flush with the surface of the insulating layer 30. The surface of the insulating layer 30 is planarized and is flush with the junction face 24a of the recording core 24.

Figure 11:
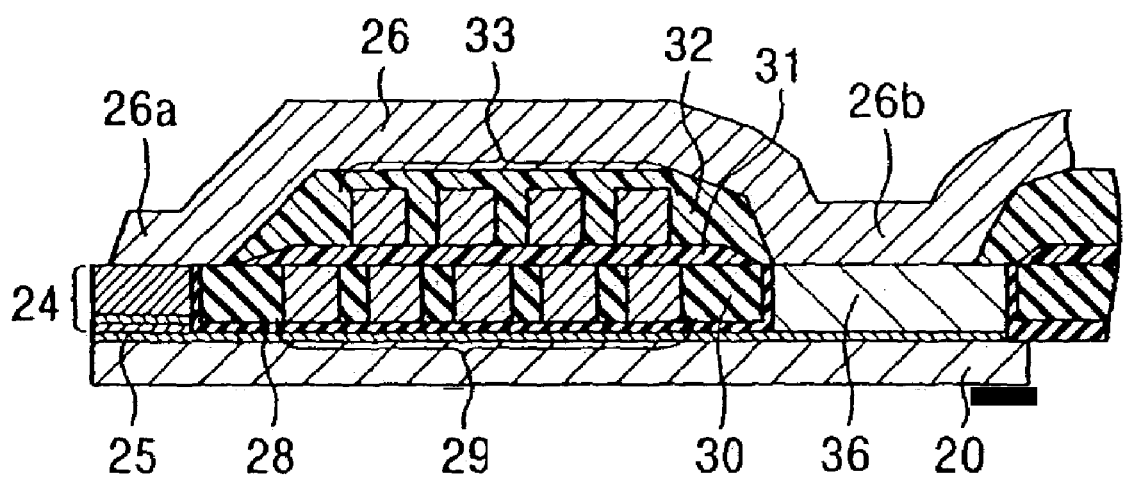
FIG. 11 shows a step subsequent to the step shown in FIG. 10.

With reference to FIG. 11, the spiral second coil layer 33 is formed on the insulating layer 31 provided on the insulating layer 30 by patterning. The first coil layer 29 and the second coil layer 33 are electrically connected to each other at the coil centers. The second coil layer 33 is covered with the insulating layer 32 formed of an organic insulating material, such as a resist or polyimide. The upper core layer 26 is patterned on the insulating layer 32 by a known process such as a frame plating process. The upper core layer 26 is formed so as to come into contact with the junction face 24a of the recording core 24 and to be magnetically coupled with the bank layer 36 formed on the base 26b of the lower core layer 20.

FIGS. 12 to 15 show a series of steps illustrating another embodiment of the method for making the thin-film magnetic head in accordance with the present invention.

Figure 12:
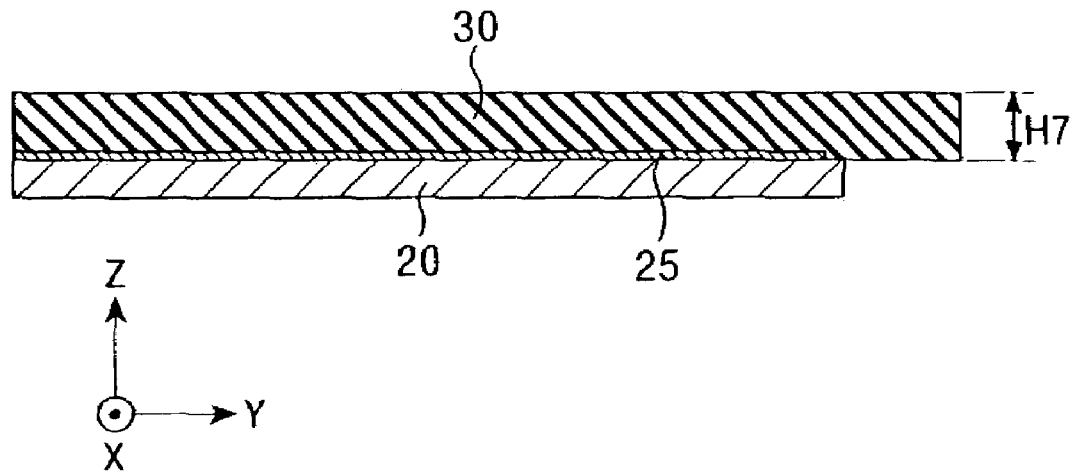
FIG. 12 shows a step in accordance with another embodiment of the method for making the thin-film magnetic head.

With reference to FIG. 12, the insulating layer 30 is formed on the plating underlayer 25 provided on the lower core layer 20. The insulating layer 30 is formed of at least one insulating material selected from AlO, $Al_2O_3$, $SiO_2$, $Ta_2O_5$, TiO, $TiO_2$, $Ti_2O_3$, AlN, AlSiN, TiN, SiN, $Si_3N_4$, NiO, $Ni_3O_4$, $Ni_2O_3$, WO, $WO_2$, $W_2O_5$, $WO_3$, BN, and CrN. The insulating layer 30 has a single-layer or multi-layer configuration and is formed by a sputtering or deposition process.

Figure 13:
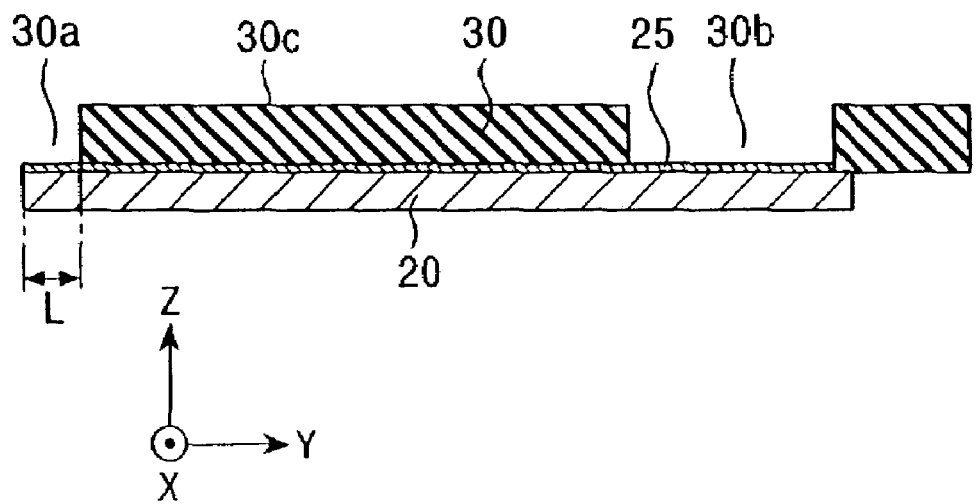
FIG. 13 shows a step subsequent to the step shown in FIG. 12.

The insulating layer 30 has a thickness in the range of approximately 1.0 to 4.0 μm. A resist material is applied onto the insulating layer 30 by a spin coating process or the like, is exposed, is developed, and is anisotropically etched to form a groove 30a substantially having the track width Tw and a cavity 30b in the insulating layer 30, as shown in FIG. 13. The width of the groove 30a is generally 1.0 μm or less and preferably 0.7 μm or less. The length L of the groove 30a is substantially the same as or larger than the gap depth of the thin-film magnetic head to be formed.

The anisotropic etching may be, for example, reactive ion etching (RIE). The groove 30a is vertically formed with respect to the surface 30c of the insulating layer 30 in the Z direction by the anisotropic etching.

Figure 14:
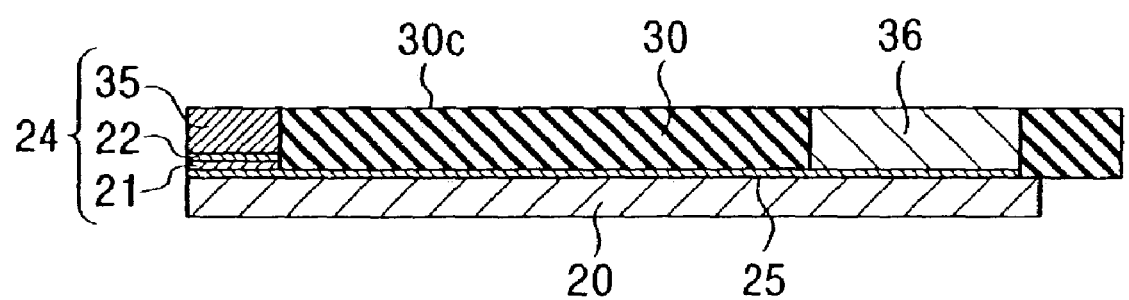
FIG. 14 shows a step subsequent to the step shown in FIG. 13.

The recording core 24 is formed in the groove 30a. As shown in FIG. 14, the recording core 24 consists of the lower magnetic pole layer 21, the gap layer 22, and the upper magnetic pole layer 35 from the bottom. These layers are continuously formed on the plating underlayer 25 by plating.

In the present invention, the gap layer 22 is formed of a specific nonmagnetic metallic material, that is, NiP in which the P content of the NiP is in the range of 11 mass percent to 14 mass percent. This gap layer 22 is nonmagnetic in an unheated state. Preferably, the P content of the NiP is in the range of 12.5 mass percent to 14 mass percent in order to maintain the nonmagnetic state of the gap layer 22 at temperatures of 200° C. or more.

The layer configuration of the recording core 24 formed in the groove 30a is not limited to the above triple-layer configuration, and may be any configuration as long as the following conditions are met. That is, the recording core 24 includes the lower magnetic pole layer 21 which connects to the lower core layer 20 and/or the upper magnetic pole layer 35 which connects to the upper core layer 26; and the gap layer 22 lies between either the upper core layer 26 or the lower core layer 20 and the corresponding magnetic pole layer or between the lower magnetic pole layer 21 and the upper magnetic pole layer 35.

In this embodiment, the lower magnetic pole layer 21 is formed by an electrolytic plating process using a pulsed current. In this case, the total charge supply (current) can be reduced while the charge supply per second is maximized during the formation of the lower magnetic pole layer 21. Thus, the supplied pulsed current is so large that the current density in the groove 30a is uniform, but does not scorch the plated layer. Accordingly, the resulting lower magnetic pole layer 21 has a substantially flat surface.

Figure 15:
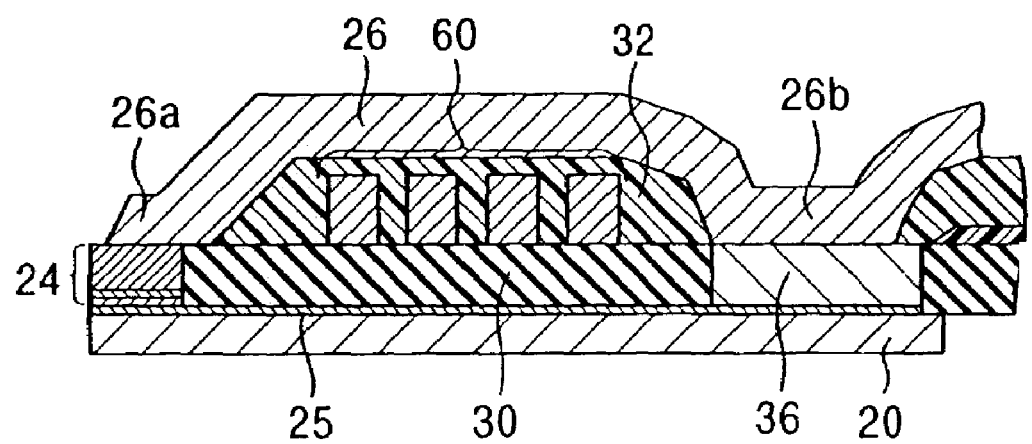
FIG. 15 shows a step subsequent to the step shown in FIG. 14.

With reference to FIG. 15, a spiral coil layer 60 is formed on the insulating layer 30 by patterning. The spiral coil layer 60 is covered with the insulating layer 32 composed of an organic material, such as a resist or polyimide. The upper core layer 26 is patterned on the insulating layer 32 by a known process such as a frame plating process.

With reference to FIG. 15, the upper core layer 26 comes into contact with the front end 26a of the recording core 24 and is magnetically coupled with the bank layer 36 formed on the base 26b of the lower core layer 20.

This embodiment includes only one coil layer 60. However, two coil layers may be provided in this embodiment by forming another coil layer in the insulating layer 30 by patterning, as in the thin-film magnetic head shown in FIG. 2.

The lower core layer 20, the gap layer 22, the upper magnetic pole layer 35, the spiral coil layer 60, and the upper core layer 26 may be formed by an electrolytic plating process using a pulsed current.

The P content of the NiP gap layer is measured with an X-ray analyzer after the position of the gap layer has been determined with a transmission electron microscope and the P content was determined by correcting the results with wet analysis data.

EXAMPLE

Figure 16:
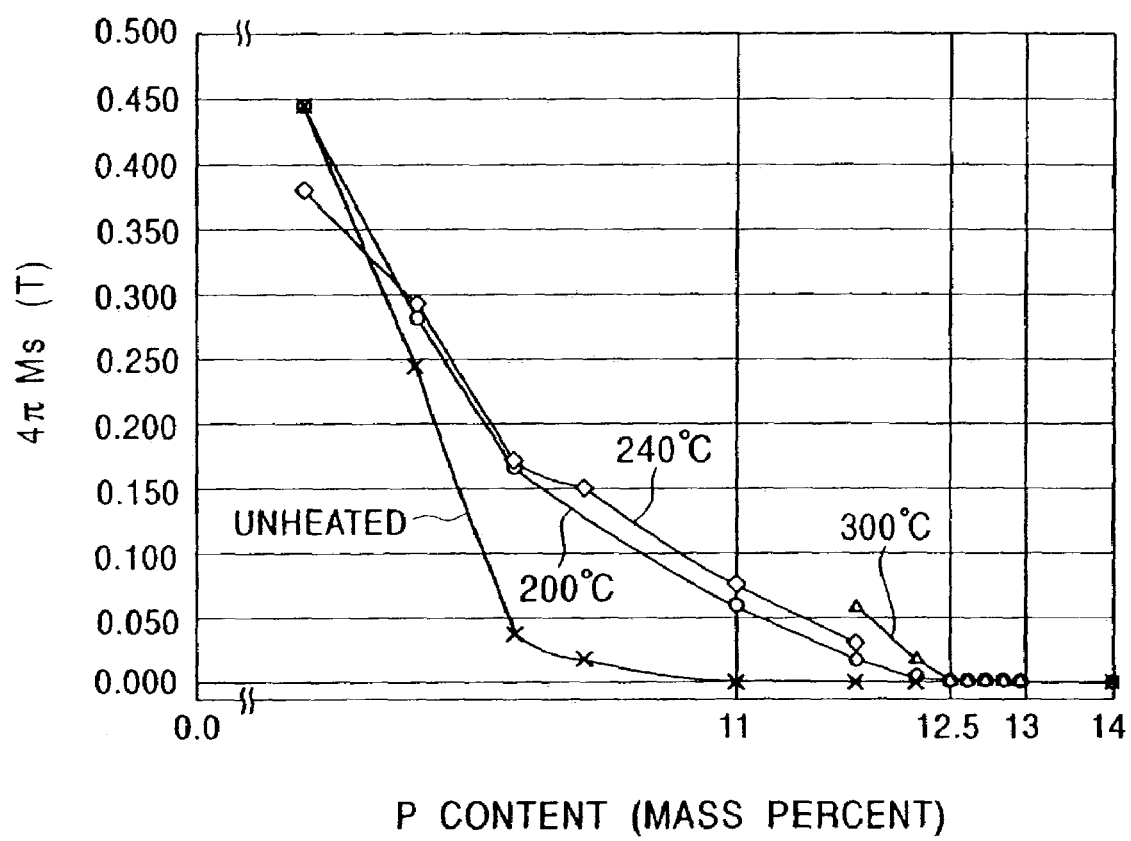
FIG. 16 is a graph illustrating the relationship between the P content in NiP and the saturation magnetic flux density of the NiP.
Figure 17:
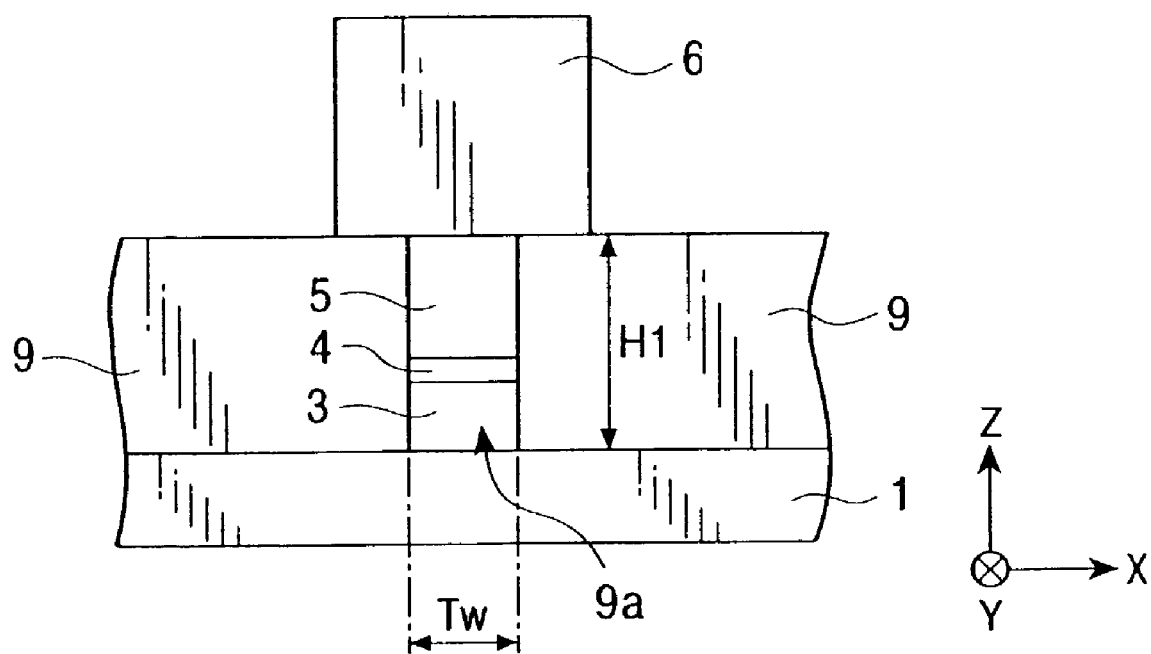
FIG. 17 is a partial front view of a conventional thin-film magnetic head.

The relationship between the P content of the NiP plated layer and the saturation magnetic flux density of the NiP was determined. The results are shown in FIG. 16.

At a P content of 11 mass percent or more, the NiP is nonmagnetic and amorphous when the plated NiP is not heated.

Furthermore, the relationship between the P content of the NiP and the saturation magnetic flux density of the NiP when the plated NiP is heated at 200° C., 240° C., and 300° C. was determined. The amorphous nonmagnetic NiP is changed into crystalline magnetic NiP at a specific P content range. According to FIG. 16, at a P content of 12.5 mass percent or more, the amorphous nonmagnetic state of the NiP is maintained when the NiP is heated to 200° C., 240° C., and 300° C.

The process of producing the thin-film magnetic head of the present invention may include a step of annealing the thin-film magnetic head at a temperature of 200° C. or more. When the P content of the NiP of the gap layer is 12.5 mass percent or more, the gap layer maintains the nonmagnetic state after annealing the thin-film magnetic head at a temperature of 200° C. or more.

When this annealing step is not employed in the production process for the thin-film magnetic head, the nonmagnetic state of the NiP of the gap layer is maintained when the P content of the NiP is 11 mass percent or more.

Even if there is an excess P content in the plating solution during the plating of the NiP layer, the P content in the resulting NiP layer does not exceed 14 mass percent. Thus, the upper limit of the P content of the NiP is 14 mass percent when the gap layer is formed of the NiP in the present invention.

The P content of the NiP was measured by the inductively coupled plasma (ICP) process in the present invention.

As described above, the P content of the NiP gap layer of the thin-film magnetic head in accordance with the present invention is controlled to be within the range of 11 mass percent to 14 mass percent so that the gap layer which is unheated is nonmagnetic. When the P content of the NiP is in the range of 12.5 mass percent to 14 mass percent, the gap layer is still nonmagnetic even after the thin-film magnetic head is heated to a temperature exceeding 200° C.

Accordingly, a leakage magnetic field can be effectively generated in the vicinity of the gap layer.

What is claimed is:

1. A thin-film magnetic head comprising:

a lower core layer;

a gap layer formed directly on the lower core layer or on a lower magnetic pole layer provided on the lower core layer; and an upper core layer formed directly on an upper magnetic pole layer defining a track width provided on the gap layer;

wherein the gap layer comprises NiP, the P content of the NiP being in the range of more than 12.5 mass percent to not more than 14 mass percent, wherein a width of the upper core layer is larger than a width of the upper magnetic pole layer, wherein a front face of the upper core layer opposing a recording medium is set back from respective front faces of the lower core layer, the lower magnetic pole layer, the gap layer, and the upper magnetic pole layer, the respective front faces also opposing the recording medium, wherein the front face of the upper core layer is slanted or curved to thereby gradually recede away from the recording medium from a lower face of the upper core layer to an upper face of the upper core layer, and wherein a front face of the upper core layer is curved at both sides along a track width direction so as to gradually recede in a direction away from the recording medium.

2. A thin-film magnetic head comprising:

a lower core layer;

a gap layer formed directly on the lower core layer or on a lower magnetic pole layer provided on the lower core layer;

an upper core layer formed directly or on an upper magnetic pole layer defining a track width provided on the gap layer;

wherein the gap layer comprises NiP, the P content of the NiP being in the range of more than 12.5 mass percent to not more than 14 mass percent, wherein a width of the upper core layer is larger than a width of the upper magnetic pole layer, wherein a front face of the upper core layer opposing a recording medium is set back from respective front faces of the lower core layer, the lower magnetic pole layer, the gap layer, and the upper magnetic pole layer, the respective front faces also opposing the recording medium, wherein the front face of the upper core layer is slanted or curved to thereby gradually recede away from the recording medium from a lower face of the upper core layer to an upper face of the upper core layer, wherein a front face of the upper core layer is curved at both sides along a track width direction so as to gradually recede in a direction away from the recording medium, and wherein the gap layer comprises a non-magnetic state before and after annealing at 200° C. or more.

* * * * *

UNITED STATES PATENT AND TRADEMARK OFFICE
CERTIFICATE OF CORRECTION

PATENT NO. : 7,289,296 B2
APPLICATION NO. : 10/631580
DATED : October 30, 2007
INVENTOR(S) : Yoshihiro Kanada et al.

It is certified that error appears in the above-identified patent and that said Letters Patent is hereby corrected as shown below:

On the Title Page

In column 1, item (54), after "GAP FORMED OF" delete "NIP" and substitute --NiP-- in its place.

In column 2, line 1, under "ABSTRACT", after "A gap" insert --layer--.

In the Specification

In column 1, in the title, after "GAP FORMED OF" delete "NIP" and substitute --NiP-- in its place.

In the Claims

Column 12, in claim 2, line 29, immediately after "annealing at 200° C" delete "." (period).

Signed and Sealed this

Twenty-fourth Day of June, 2008

JON W. DUDAS
*Director of the United States Patent and Trademark Office*